Sept. 30, 1924.  
E. H. JACOBS  
1,510,227  
CUT-OUT FOR ELECTRICAL CIRCUITS  
Filed March 21, 1921  2 Sheets-Sheet 1
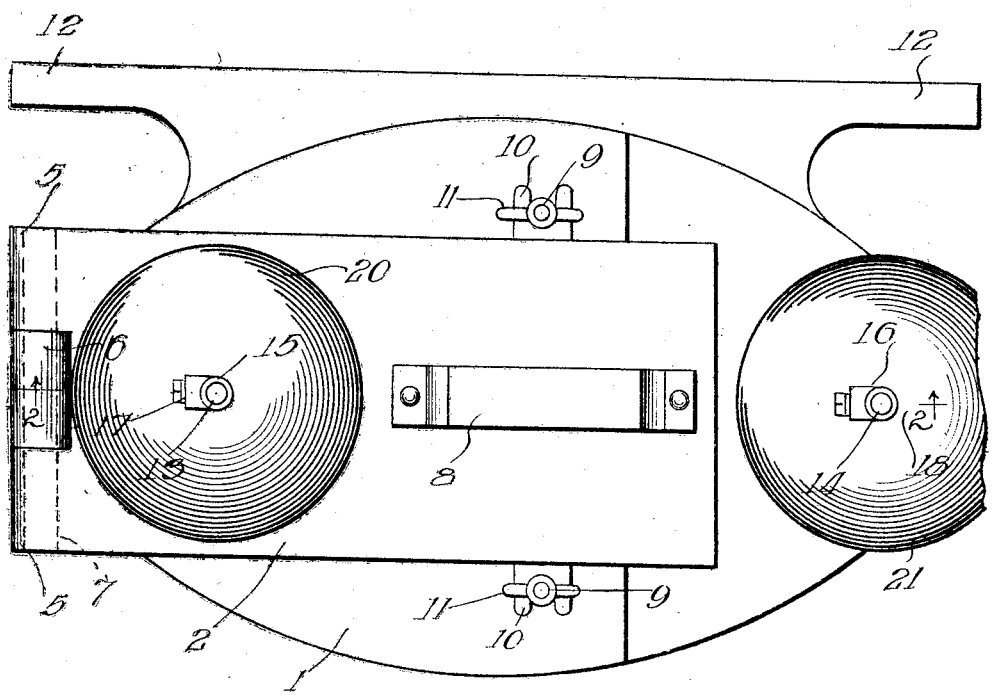
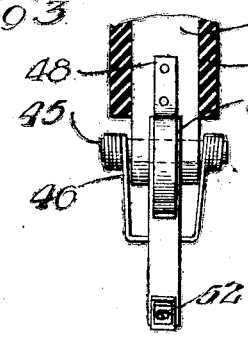
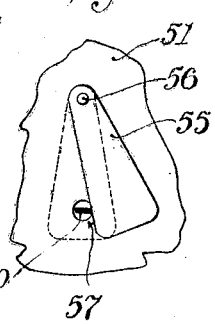
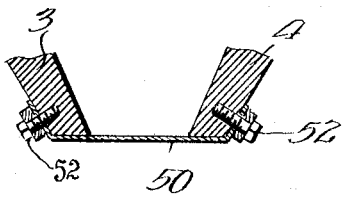
Witnesses:  
Inventor  
Ernest H. Jacobs  
By Diennes Attys.

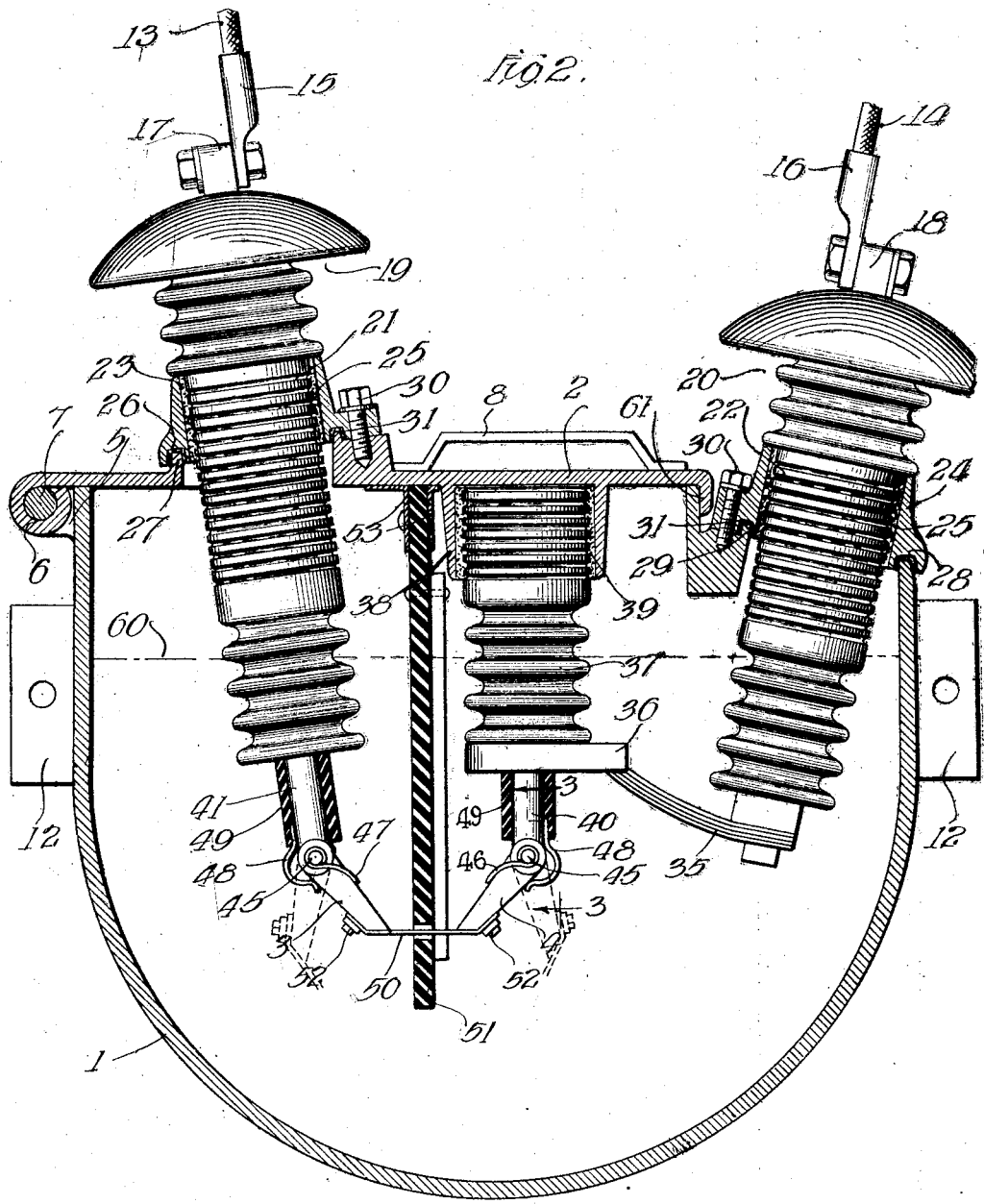

Patented Sept. 30, 1924.

1,510,227

UNITED STATES PATENT OFFICE.

ERNEST H. JACOBS, OF CHICAGO, ILLINOIS, ASSIGNOR TO ELECTRICAL ENGINEERS EQUIPMENT COMPANY, OF CHICAGO, ILLINOIS, A CORPORATION OF ILLINOIS.

CUT-OUT FOR ELECTRICAL CIRCUITS.

Application filed March 21, 1921. Serial No. 453,889.

*To all whom it may concern:*

Be it known that I, ERNEST H. JACOBS, a citizen of the United States, residing at Chicago, in the county of Cook and State of Illinois, have invented a certain new and useful Improvement in Cut-Outs for Electrical Circuits, of which the following is a full, clear, concise, and exact description, reference being had to the accompanying drawings, forming a part of this specification.

My invention relates to cut-outs for electrical circuits.

The desirability of fuses for protecting the line and apparatus in an electrical circuit is well known in the art. In low and moderate voltage work and especially in small capacity circuits the fuse may be replaced while voltage is upon the line without danger to the operator. Special precaution must be taken where high voltages are employed or large amounts of power are to be dealt with. In such cases, especially where high voltages are employed, replacement of a fuse in the line has heretofore been either with great danger to the operator, or with great difficulty and precaution on his part.

In what I now consider to be the preferred embodiment of my present invention, the fuse is submerged in a liquid such as oil within a suitable receptacle or casing. Terminals or contacts within the receptacle are so arranged that opening of the cover of the receptacle will break or open the circuit, while closing of the cover will close the circuit. Inspection and repair as well as renewal of the fuse may be thereby had without subjecting the operator to danger from the line voltage, the very act of gaining access to the fuse or interior of the cut-out when such access is desired, breaking or opening the circuit to make such access safe.

My invention seeks maximum protection for the operator upon manipulation of the device, as for example in replacing a fuse, or in inspecting or repairing the interior of the device, maximum protection with a minimum amount of precaution on the part of the operator; maximum protection against damage or injury upon operation or blowing of the fuse; and maximum simplicity, ease of operation, and accessibility in a simple weather-proof and reliable device.

Certain structural features of my invention are novel and important and are therefore made the subject matter of some of the appended claims.

In the accompanying drawings:

Figure 1 is a plan view of a cut-out embodying my invention;

Figure 2 is a vertical sectional view taken substantially on the line 2—2 of Figure 1;

Figure 3 is an enlarged fragmentary section taken on the line 3—3 of Figure 2;

Figure 4 is an enlarged fragmentary vertical section through the pivoted terminal arms of the device; and Figure 5 is an elevational view on a reduced scale of the insulating barrier, looking from the right in Figure 2.

Referring now to the drawings, the device which I have shown comprises a closed vessel in the nature of a casing 1 having a removable cover or lid 2 through which an electrical conductor terminating in a pivoted terminal member 3 projects. The cover 2 is preferably hinged to the casing or receptacle 1 at one end through cooperating turned or rolled back ears or lugs 5 and 6 and a suitable pin or pintle 7. A suitable handle 8 carried by the cover 2 provides for swinging the same about the pintle 7 into either open or closed position. The cover 2 is adapted to be held or locked in its closed position by the cooperation of bolts 9 pivotally carried by the casing 1 with slotted wings or lugs 10 projecting from the cover 2 and suitable wing nuts 11. A packing or gasket may be provided between the cover 2 and the upper edge of the casing 1 if so desired to increase the tightness of the joint therebetween. Bracket arms 12 formed integral with the casing 1 provide for securing or mounting the device as desired.

The conductors 13 and 14 are connected into suitable socket terminals 15 and 16 secured to the upper ends of suitable conducting members 17 and 18 which conducting members are led through the cover 2 and casing 1 respectively, by means of suitable insulators 19 and 20, which insulators may be of any preferred type. The insulator 19 extends through and is mounted in the cover 2. The insulator 20 extends through and is mounted in the top or upper wall of the casing 1. The mounting of these insulators is preferably such that the openings through which they extend are sealed to maintain the tight joint between the casing and the cover.

In the particular arrangement shown, the lower reduced portions 21 and 22 of these insulators extend through and are cemented in mounting rings 23 and 24, respectively. The lower reduced portions of the insulators 19 and 20 are provided with suitable corrugations which permit the cementitious or binding material 25 to insure a firm grip upon the outer surfaces thereof. The interior surfaces of the rings 23 and 24 may be corrugated likewise if so desired. The base or under surface of the ring 23 is provided with a groove 26 for the reception of an upstanding flange or ridge 27 about the opening in the cover 2 through which the insulator 19 extends. The base or under surface of the ring 24 is provided with a groove 28 for the reception of a similar flange 29 about the opening in the casing through which the insulator 20 extends. Suitable bolts 30 extend through lugs projecting radially from the bases of the rings 23 and 24 and engage in the wall of the cover 2 and the top or upper wall of the casing 1 to securely clamp the rings in place. Packings or gaskets 31 between the ring 23 and the cover 2 and the ring 24 and the casing 1 provide tight joints therebetween.

The lower projecting end of the conducting member extending through the insulator 20 terminates in a contact piece 35, which contact piece may be laminated as shown or formed otherwise as desired. When the cover 2 is closed as shown, the free end of the contact piece 35 is adapted to make electrical contact with a terminal piece 36 carried by the lower end of a supporting insulator 37 suspended from the cover 2. The upper end of the insulator 37 is cemented or otherwise suitably mounted in a recessed or hollow boss 38 extending downwardly from the cover 2. Corrugations about the upper end of the insulator 37 permit the cementitious or binding material 39 to insure a firm grip upon the surface of the insulator.

The downwardly projecting conducting piece 40 which may be formed integral with the terminal piece 36 although suitable electrical connection therewith is sufficient, carries a terminal member 4 pivotally connected therewith and arranged in spaced relation to the terminal member 3, which terminal member 3 is pivotally carried by the downward projecting end 41 of the conductor extending through the insulator 19. The lower end of the downwardly projecting conducting piece 40 is bifurcated (Figure 3) for the reception of the upper end of the terminal member 4 which is pivoted upon a pin or pintle 45 extending therethrough. A spring 46 coiled about the pintle 45 at its opposite ends, engages the upper edge of the terminal member 4 within its length, so as to tend to throw such member about its pivot in a counterclockwise direction. The terminal member 3 is similarly mounted in the lower end of the conducting piece 41. A spring 47 similar to the spring 46 tends to throw the terminal member 3 in a clockwise direction about its pivot. Obviously the tendency of the springs 46 and 47 is to spread or throw the terminal members 3 and 4 apart. This movement of the terminal members 3 and 4 is opposed to a certain extent by spring clips 48 secured at their upper ends in insulating sleeves 49 surrounding the downwardly extending conducting pieces 40 and 41.

A fusible link or strip 50 connects the lower end of the terminal arms 3 and 4 against the tension of the springs 46 and 47 tending to spread such arms. The fusible link or fuse strip 50 extends through a barrier or partition 51 of insulation which barrier or partition 51 is arranged between the terminal arms 3 and 4 and associated terminal connections to effectively prevent accidental connection therebetween. The free ends of the strip 50 are connected to the arms 3 and 4 by means of suitable clamping screws 52. The upper end of the insulating barrier 51 is preferably secured to the under surface of the cover 2 by means of suitable angle pieces 53. An insulating plate 55 pivoted to the barrier 51 as at 56 and held in the position shown in Figures 2 and 5 by engagement with the fuse link 50 extending through the opening 57 and the barrier 51 is adapted to swing into the dotted line position shown in Figure 5 upon blowing of the fuse to effectively close the opening 57.

The barrier 51 may even be arranged for vertical sliding movement in suitable guides depending from the cover or extending up from the bottom of the casing so as to slide down between the arms 3 and 4 upon blowing of the fuse to effectively extinguish the arc.

The operation of the device is as follows:

Assuming that the casing is properly mounted and that the conductors 13 and 14 are connected into their respective terminal sockets, the interior of the casing is substantially filled with oil or other suitable insulating or arc suppressing liquid to about the dot and dash line indicated at 60 in Figure 2. This body of liquid is sufficient to cover the conducting pieces projecting downwardly from the insulators 19, 20 and 37, namely, the contact piece 35, terminal arms 3 and 4, fusible link 50 and associated connections. The fusible link 50 is then inserted through the opening provided therefor through the insulating barrier 51 and connected between the arms 3 and 4 against the tension of the springs 46 and 47 whereupon the cover or lid 2 is swung down upon the upper edge of the flange 61 extending upwardly from the top of the casing 1 and clamped in place to render the casing substantially fluid tight. Upon bringing the cover 2 down into place, the terminal piece 36 carried by the insulator 37, is moved into engagement with the stationary contact 35, to close the circuit through the device. The space between the upper surface of the insulating liquid in the receptacle and the cover or lid is preferably relatively small and the terminal arms and contact members are preferably arranged substantially centrally within such body of oil so that quick and effective extinguishing or damping of the arc will be had upon blowing of the fuse. Assume that the current passing through the device rises to an overload value sufficient to melt the fuse 50. The plate 55 will thereupon drop to effectively close the opening 57 and springs 46 and 47 will throw the arms 3 and 4 apart into substantially the positions shown in dotted lines, the spring clips 48 limiting such throw as desired.

The blown fuse may be quickly and conveniently replaced by loosening the wing nuts 11 and swinging the cover or lid 2 upwardly about its hinge 7. The terminal piece 36 is moved up with the cover 2 upon such movement, and away from the stationary contact member 35 breaking the circuit and thereby insuring against electrical flow through the device until the terminal piece 36 is again moved into engagement with the contact member 35 by closing the cover 2. The terminal arms 3 and 4 are likewise carried with the cover 2 into readily accessible position above the casing 1 where a new fuse link may be readily connected between them. It is to be noted that when the cover is lifted or opened, connection of the terminal arms 3 and 4 either accidentally or by the insertion of a new fusible link will not set up a flow through the device, such flow being dependent upon the closing of the cover.

Should it be desired to interrupt the flow of current through the device independent of the occurence of an overload, as to facilitate inspection or repair, lifting or opening of the cover for such purpose will break or open the circuit. The circuit will then remain open until the cover is again closed whereupon engagement of the terminal piece 36 with the contact member 35 will again close the circuit, provide of course that the proper fuse link is in place.

I do not intend that the invention shall be limited to the precise details of construction shown and described.

I claim:

1. In combination, a casing, a lid for said casing, a fuse structure movable with said lid and a single terminal for completing a circuit through the fuse structure when the lid is closed.

2. In combination, a casing, a lid for said casing, a fuse structure movable with said lid and a single terminal carried by the casing for completing a circuit through the fuse structure when the lid is closed.

3. In combination, a casing element and a lid element one movable relative to the other, a fuse structure carried by one of said elements and a single terminal carried by the other element for controlling the circuit through the fuse structure by relative movement between the casing and lid elements.

4. In combination, a casing, a lid for said casing, terminal means carried by and movable with the lid, and a single terminal carried by the casing for completing a circuit through said first terminal means when the lid is closed.

5. In combination, a casing, a lid for said casing, a pair of insulators carried by the lid, terminal means carried by one of said insulators and confined wholly within the casing, terminal means carried by the other insulator and opening through the lid for external connection, fusible means connecting said terminal means, and a terminal engageable with said first terminal means to complete the circuit through said fusible means when the lid is closed.

6. In combination, a casing having an insulator extending therethrough, a conducting member led into the casing through said insulator, said conducting member terminating in a stationary contact, a lid for the casing, a pair of insulators carried by said lid, a conducting member led into the casing through one of said insulators, said conducting member terminating in a fuse terminal, a fuse terminal carried by the other of said insulators and a conducting piece carried by said other insulator for engaging and disengaging the stationary contact to make and break the circuit.

7. In combination, a casing, a lid for said casing, insulator mounting means depending from said lid, an insulator mounted at its upper end in said mounting means, said lid having an opening therethrough, a mounting ring mounted about said opening, a second insulator mounted in said ring and extending through the lid and into the casing, terminal means at the inner ends of said insulators, means connecting said terminal means, and a terminal cooperable with said terminal means to complete a circuit through said connecting means.

8. In combination, a casing having an opening leading into the same, a mounting ring attached about said opening, an insulator mounted within its length in said ring and extending into and from the casing, a terminal for external connection at the outer end of said insulator, and a terminal at the inner end of said insulator.

9. In combination, a casing, a lid for said casing, a terminal carrying insulator carried by said lid and depending vertically into the central portion of the casing, a second terminal carrying insulator carried by said lid, a terminal carrying insulator mounted in the casing, said second lid insulator and said last insulator converging into the casing toward said first insulator, fusible means connecting the terminals of the insulators carried by the lid, and means connecting the terminal of the first lid insulator with the terminal of the insulator carried by the casing, said connection being made and ruptured by the opening of the cover.

10. In combination, a casing, a lid for said casing, a fuse structure movable with said lid, said fuse structure including a pair of terminals, and a single terminal carried by the casing for making and breaking a circuit through said fuse structure by opening and closing of said lid, one of said fuse terminals and said casing terminal having external connectors for connecting the device into an external circuit.

11. In combination, a casing, a lid for said casing, an insulator mounted in and movable with the lid, a terminal for circuit connection at the outer end of said insulator, terminal means at the inner end of the insulator, an insulator mounted in the casing, said last insulator having a terminal for circuit connection at its outer end and a terminal at its inner end co-operable with said first terminal means.

12. In combination, a casing element, a lid element therefor, an insulator mounted in and movable with the lid element, a terminal for circuit connection at the outer end of said insulator, terminal means at the inner end of the insulator, an insulator mounted in the casing, said last insulator having a terminal for circuit connection at its outer end and a terminal at its inner end co-operable with said first terminal means, and a third insulator carried by one of said first two elements and having terminal means for electrical connection with the terminal means at the inner end of the other insulator carried by said element.

13. In combination, a casing element, a lid element therefor, terminal means carried by one of said elements and opening through said element for connection into a circuit, and terminal means carried by and opening through the other of said elements for circuit connection, said last terminal means making and breaking a circuit through the first terminal means by closing and opening of the lid element.

In witness whereof, I hereunto subscribe my name this 11th day of March, 1921.

ERNEST H. JACOBS.